United States Patent [19]

Takei

[11] Patent Number: 5,282,024
[45] Date of Patent: Jan. 25, 1994

[54] WHITE BALANCE CORRECTION DEVICE

[75] Inventor: Hirohumi Takei, Tokyo, Japan

[73] Assignee: Canon Kabushiki Kaisha, Tokyo, Japan

[21] Appl. No.: 975,203

[22] Filed: Nov. 12, 1992

Related U.S. Application Data

[63] Continuation of Ser. No. 860,129, Mar. 31, 1992, abandoned, which is a continuation of Ser. No. 563,501, Aug. 6, 1990, abandoned.

[30] Foreign Application Priority Data

Aug. 23, 1989 [JP] Japan .................. 1-215042

[51] Int. Cl.⁵ .......................... H04N 9/64; H04N 9/04
[52] U.S. Cl. ........................................ 348/223
[58] Field of Search ............... 358/29, 29 C, 41, 44, 358/209, 160; H04N 9/64, 9/04

[56] References Cited

U.S. PATENT DOCUMENTS

| | | | |
|---|---|---|---|
| 4,200,884 | 4/1980 | Nagumo | 358/29 C |
| 4,219,841 | 8/1980 | Nishimura et al. | 358/29 C |
| 4,234,890 | 11/1980 | Astle et al. | 358/29 C |
| 4,368,482 | 1/1983 | Machida et al. | 358/29 C |
| 4,486,771 | 12/1984 | Machida et al. | 358/29 C |
| 4,562,459 | 12/1985 | Sokei | 358/29 C |
| 4,679,067 | 7/1987 | Belmares-Sarabia et al. | 358/29 |
| 4,727,413 | 2/1988 | Miura et al. | 358/29 C |
| 4,736,241 | 4/1988 | Murakami et al. | 358/29 C |
| 4,750,032 | 6/1988 | Nakayama | 358/29 C |
| 4,797,733 | 1/1989 | Takagi et al. | 358/41 |
| 4,883,360 | 11/1989 | Kawada et al. | 358/29 C |

FOREIGN PATENT DOCUMENTS

| | | | |
|---|---|---|---|
| 0050795 | 4/1980 | Japan | 358/29 C |
| 0002496 | 1/1984 | Japan | 358/29 C |

Primary Examiner—Victor R. Kostak
Assistant Examiner—Michael H. Lee
Attorney, Agent, or Firm—Robin, Blecker, Daley & Driscoll

[57] ABSTRACT

A white balance correction device comprises a gain control circuit which controls the gain of a color signal coming from an image sensor, a color detecting circuit which detects the color of an object on the basis of a signal output from the gain control circuit, and a signal forming circuit which forms a signal for the gain control operation of the gain control circuit.

24 Claims, 4 Drawing Sheets

| 1 | 2 | 3 | 4 | 5 |
|---|---|---|---|---|
| 6 | 7 | 8 | 9 | 10 |
| 11 | 12 | 13 | 14 | 15 |
| 16 | 17 | 18 | 19 | 20 |

WHITE BALANCE CORRECTION DEVICE

This is a continuation under 37 CFR 1.62 of prior application Ser. No. 860,129, filed Mar. 31, 1992 now abandoned, which is a continuation of application Ser. No. 07/563,501, filed Aug. 6, 1990, now abandoned.

BACKGROUND OF THE INVENTION

1. Field of the Invention

This invention relates to the white balance correction device of an image sensing apparatus such as a video camera or the like.

2. Description of the Related Art

The white balance correcting methods for the image sensing apparatus such as a video camera or the like can be roughly divided into two classes. One is a method of using a color temperature sensor. The other is a method of using a video signal.

FIG. 1 of the accompanying drawings is a block diagram showing the circuit arrangement of the conventional image sensing apparatus adopting the automatic white balance correcting method of using a video signal. Referring to FIG. 1, the illustration includes an image sensor 1; a luminance and chromaticity forming part 2; a red (R) signal gain control part 3; a blue (B) signal gain control part 4; a color-difference signal forming part 5; an encoder 6; gate parts 7 and 8; clipping parts 9 and 10; an R-B signal detecting part 11; an averaging part 12; a comparing and amplifying part 13; a tracking correction part 14 which is arranged to generate tracking correction signals. Parts 7-14 comprise and an automatic white balance correction signal generating device 15b.

Referring to FIG. 1, an image formed on the image sensor 1 is converted into an electrical signal. The electrical signal is supplied to the luminance and chromaticity forming part 2. The part 2 then forms a luminance signal YH which has a luminance signal frequency band, a luminance signal YL which has a color signal frequency band, and color signals including an R signal and a B signal respectively. The R and B signals are respectively supplied to the gain control parts 3 and 4. At the gain control parts 3 and 4, the levels of the R and B signals are controlled according to control signals output from the tracking correction part 14. These signals are then output from the parts 3 and 4 as an R' signal and a B' signal respectively. The R' and B' signals are then supplied together with the luminance signal YL to the color-difference signal forming part 5. At the part 5, color-difference signals R−YL and B−YL are formed from these three input signals. Further, the color-difference signals R−YL and B−YL are supplied together with the luminance signal YH to the encoder 6. As a result, the encoder 6 produces a standard TV signal.

The color-difference signals R−YL and B−YL are distributed via terminals M and N also to the automatic white balance correction signal generating device 15b. Within the device 15b, these input signals R−YL and B−YL are supplied to the gate parts 7 and 8. The gate parts (or circuits) 7 and 8 remove, from these inputs, unnecessary signals obtained during a blanking period and any abnormal signal that is caused by level saturation occurring in taking a picture of a high luminance object.

Signals R−YL and B−YL thus output from the gate parts 7 and 8 are supplied respectively to the clipping parts 9 and 10. At the clipping parts 9 and 10, any color-difference signal that has, within a practical color temperature range, an excessive degree of saturation is thus processed to limit its amplitude.

The color-difference signals R−YL and B−YL are thus subjected to the processes of varied kinds to be converted into signals (R−YL)' and (B−YL)'. The color-difference signals (R−YL)' and (B−YL)' are supplied to the R−B signal detecting part 11. At the part 11, an (R−B) signal is obtained from a difference between the signals R−YL)' and (B−YL)'. The (R−B) signal is supplied to the averaging part 12 to undergo an averaging process. As a result, the (R−B) signal of a value averaged for a whole image plane is obtained in a DC value. The averaged (R−B) signal is supplied to the comparing and amplifying part 13. At the part 13, the signal output from the averaging part 12 is compared with a reference voltage Vref1, which is a voltage corresponding to R−B=0. Then, a signal representing the result of comparison is supplied to the tracking correction part 14.

The tracking correction part 14 forms gain control signals for the gain control parts 3 and 4 on the basis of the signal output from the comparing and amplifying part 13. As a result, the circuit arrangement operates to correct the white balance of a video signal. As apparent from the above description, a negative feedback loop is formed by the gain control parts 3 and 4, the color-difference signal forming part 5 and the automatic white balance correction signal generating part 15b. The color-difference signals are supplied to the encoder 6 after white balance adjustment. The encoder 6 then produces a standard TV signal.

The conventional white balance correction device, however, sometimes makes a correction error. In a typical example of such cases, the color distribution of an object to be shot consists of 50% in white and 50% in yellow. The device operates in this case as described below with reference to a vectorial representation of FIG. 2 in conjunction with the block diagram of FIG. 1.

The points of white and yellow on the vectorial representation of FIG. 2 are assumed to be W and Ye when the gains of the gain control parts 3 and 4 of FIG. 1 are at the rate of one-fold. In this instance, the negative feedback loop acts to cause the (R−B) signal to be zero. Therefore, the direction of white balance correction is in parallel to an axis R−B of the vectorial representation. Points on vectors where the negative feedback action becomes stable are Ye' and W' at which there obtains a relation Ye−Ye'=Ye'−a=a−b=W−W'. A segment Ye−b is in parallel to the axis R−B. A point "a" is located on a segment which passes through an origin W and is perpendicular to the axis R−B.

As shown in FIG. 2, points Ye and W after correction are located in coordinate positions Ye' and W' respectively. In other words, the yellow color changes toward green and the white color toward blue. The white balance correction is thus not adequately performed.

As described above, in cases where the color temperature distribution of the object is uneven and eccentric, the conventional white balance correction device makes an error in correcting white balance. It has been thus difficult to attain an adequate effect of correction under such a condition.

SUMMARY OF THE INVENTION

The present invention is directed to the solution of the above-stated problem of the prior art.

It is, therefore, an object of the invention to provide a white balance correction device which is capable of attaining an adequate white balance correcting effect by lessening any white balance correction error that is caused by the uneven and eccentric color temperature distribution of an object to be photographed.

To attain the above-stated object, a white balance correction device arranged according to this invention as an embodiment thereof comprises; gain control means for controlling the gain of a color signal produced by an image sensor, color detecting means for detecting the color of an object on the basis of a signal output from the gain control means; and signal forming means for forming a gain control signal to be supplied to the gain control means in accordance with a signal output from the color detecting means.

It is a feature of the above-stated arrangement that, in cases where the object is of a misleading color for balance correction, gain control is performed in such a way as to lessen a correction error.

The above and other objects and features of the invention will become apparent from the following detailed description of an embodiment thereof taken in connection with the accompanying drawings.

DETAILED DESCRIPTION OF THE PREFERRED EMBODIMENT

The following describes the details of this invention through an embodiment thereof.

Figure 1:
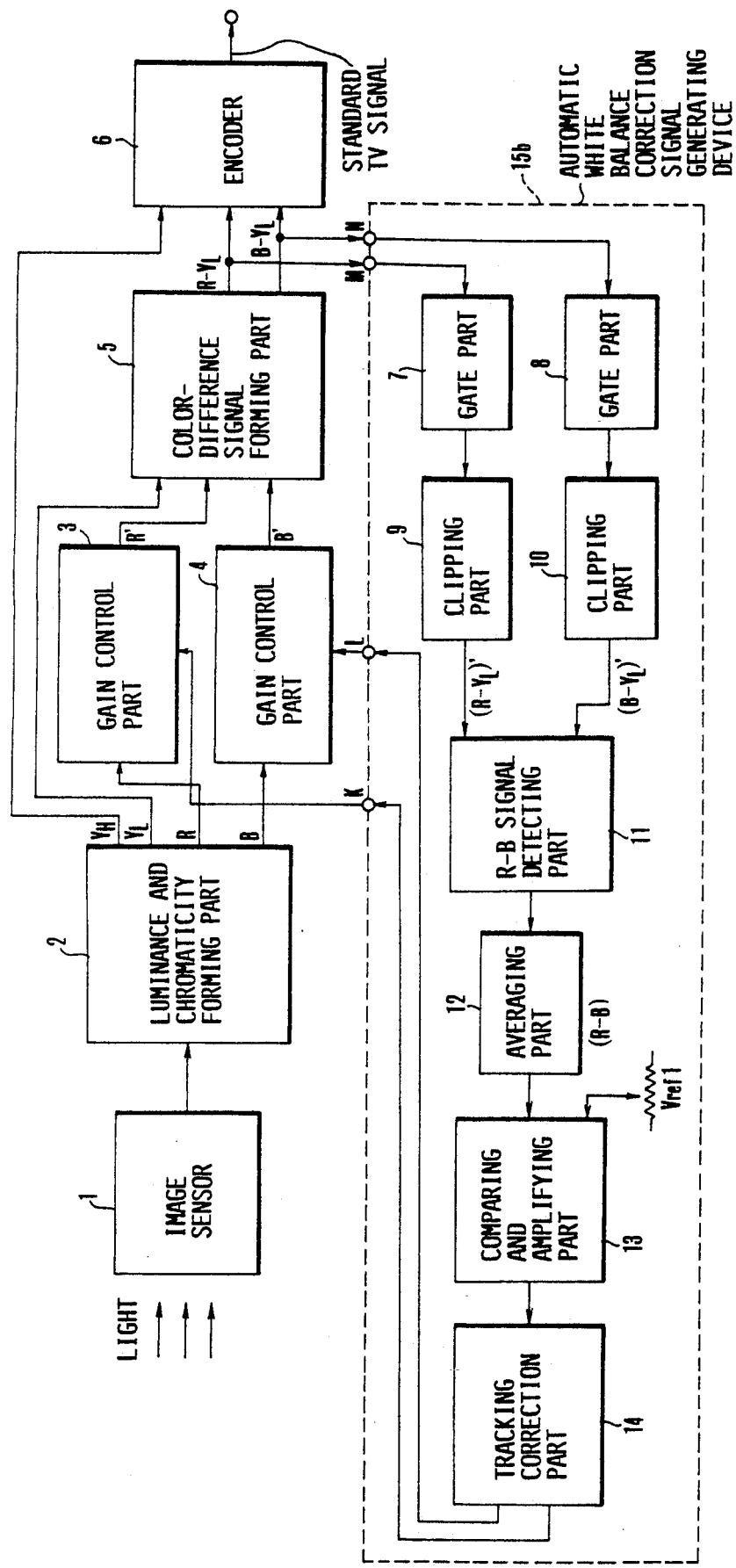
FIG. 1 is a block diagram showing the circuit arrangement of the conventional white balance correction device.
Figure 2:
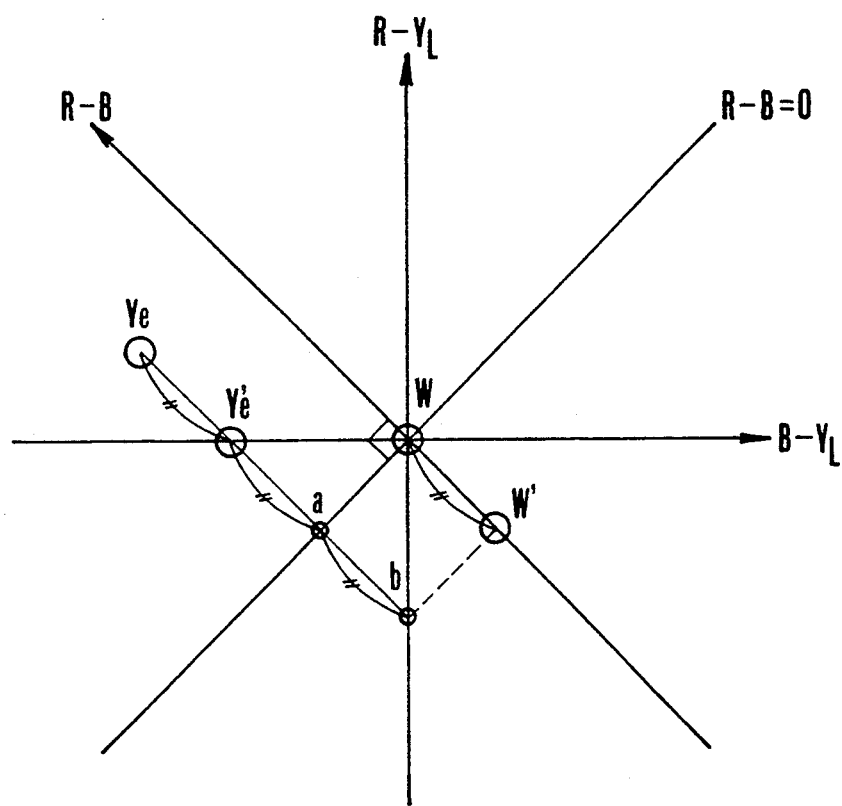
FIG. 2 is a vectorial representation showing the operation of the conventional device shown in FIG. 1.
Figure 3:
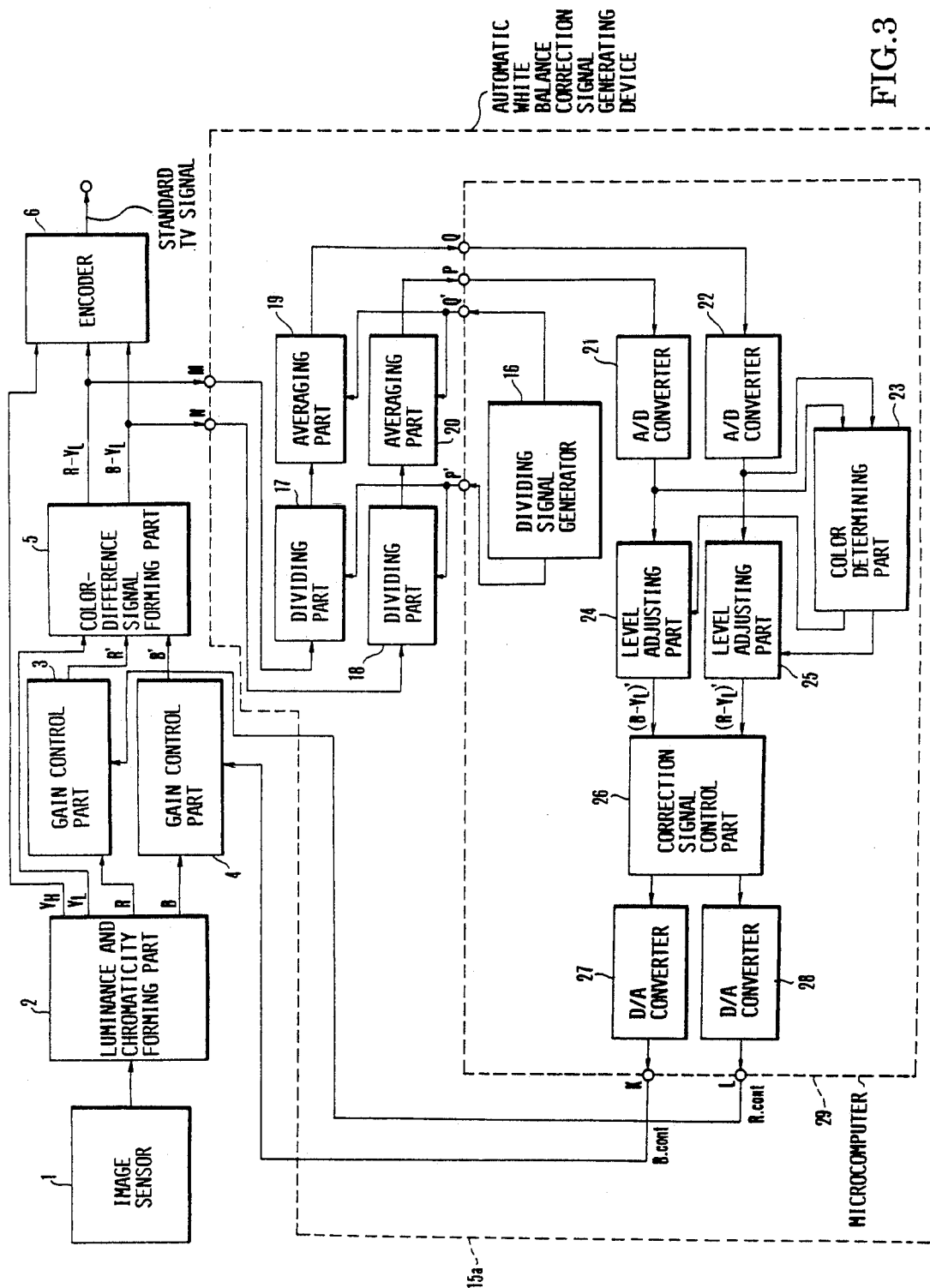
FIG. 3 is a block diagram showing the circuit arrangement of an embodiment of this invention.

FIG. 3 is a block diagram showing a white balance correction device 15a arranged as an embodiment of this invention. In FIG. 3, the same parts as those shown in FIGS. 1 and 2 are indicated by the same reference numerals as in FIGS. 1 and 2. Referring to FIG. 3, a dividing signal generator 16 is arranged to generate a dividing signal for dividing color-difference signals and to output, from a terminal P', a switching pulse for every vertical scanning period V for the purpose of taking out a part of each of the color-difference signals obtained within an image plane. The dividing signal generator 16 also outputs, from a terminal Q', a reset pulse at the end of every period V. Dividing parts 17 and 18 are arranged to divide color-difference signals R−YL and B−YL respectively by operating analog switches, etc., in accordance with the dividing pulse coming from the terminal P'. An averaging part 19 is arranged to average the divided signals R−YL. Another averaging part 20 is arranged to average the divided signals B−YL. The averaged signals are supplied from terminals P and Q to a microcomputer 29. An analog-to-digital (A/D) converter 21 is arranged to convert, into a digital signal, the averaged signal B−YL which comes from the terminal P. Another A/D converter 22 is arranged to convert, into a digital signal, the averaged signal R−YL which comes from the terminal Q. A color determining part 23 is arranged to determine the color of each divided part on the basis of values obtained from the A/D converters 21 and 22 and to control level adjusting parts 24 and 25 according to information thus obtained. The level adjusting part 24 is arranged to adjust the value obtained from the A/D converter 21 in accordance with a signal output from the color determining part 23. The other level adjusting part 25 is arranged to adjust the value obtained from the A/D converter 22 in accordance with a signal output from the color determining part 23. A white balance correction signal control part 26 is arranged to control white balance correction outputs on the basis of the outputs (R−YL)' and (B−YL)' of the level adjusting parts 24 and 25. A digital-to-analog (D/A) converter 27 is arranged to convert, from a digital value into an analog value, the value of an output of the correction signal control part 26 and to produce a white balance correction signal B.cont. A D/A converter 28 is likewise arranged to produce a white balance correction signal R.cont. In this embodiment, elements 16 to 23 form color detecting means for detecting the color of the object.

Figures 4, 5:
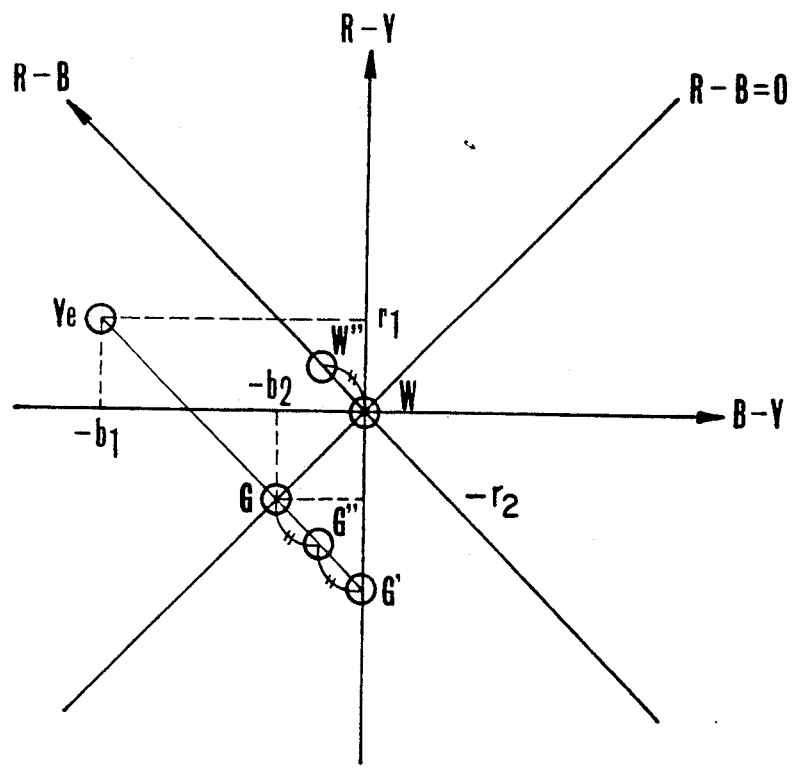
FIG. 4 shows the image plane dividing arrangement of color detecting means of the same embodiment.
FIG. 5 is a vectorial representation showing the operation of the same embodiment.

The embodiment performs the image plane dividing action in the following manner. FIG. 4 shows a case where the image plane is divided for example into 20 blocks in the order of numbers assigned as shown in FIG. 4 within one field. The averaging parts 19 and 20 average and amplify the divided color-difference signals before they are supplied to the microcomputer 29 as data. When the data is taken in by the A/D converters 21 and 22 of the microcomputer 29, the contents of the averaging parts 19 and 20 are reset by the reset pulse output from the dividing signal generator 16.

The operation described above is performed for every field. The data of each of the divided image plane parts is supplied to the microcomputer 29. The microcomputer 29 then performs a white balance correcting action on the basis of the divided data.

Next, the operation of the color determining part 23 is performed as follows. The A/D-converted data R−YL and B−YL are supplied to the color determining part 23. The input data are compared with reference values Rref and Bref which have been set within the color determining part 23 to indicate the reference white levels of the color-difference data R−YL and B−YL. Through this comparison, the kind of color existing within each of the divided blocks is determined. Let us assume that, for the sake of simplification, both the reference values Rref and Bref are zero and that the input data R−YL and B−YL of a certain block are r1 and −b1 respectively. If there obtains a relation of r1<b1 and r1>0, the color of this specific block is considered to be located at a point Ye of a vectorial representation of FIG. 5. In this instance, a signal for multiplying the data B−YL by "x" to make it into data −b2 and another signal for multiplying the data R−YL by "y" to make it into data −r2 are respectively supplied to the level adjusting parts 24 and 25 respectively. In actuality, the signal at the point Ye of the vectorial representation of FIG. 5 is converted into a signal at a point G and is supplied to the correction signal control part 26.

At the correction signal control part 26, gain control signals are formed on the basis of the input signals and the white level reference values Rref and Bref. The gain control signals thus generated are supplied to the gain control parts 4 and 3 via the D/A converters 27 and 28 respectively. Then, the white balance correcting action is performed according to these control signals.

Therefore, in cases where the color distribution of the object consists of 50% in white and 50% in yellow, for example, the negative feedback loop acts to make the (R−B) signal zero. However, the (R−B) signal at the point Ye is supplied to the correction signal control part 26 as a signal at the point G where the signal at the point Ye is converted into zero. This arrangement ensures, unlike the conventional device, an adequate white balance correcting action without any correction error. In the case of this embodiment, the circuit elements 24 to 28 are arranged to form a signal forming means for forming the gain control signal for gain control means. Further, the signal at the point Ye does not have to be converted into the signal at the point G. It may be converted into a signal at any other point that ensures white balance correction without any error. For example, assuming that the point Ye is converted into a point G' instead of the point W after white balance correction becomes a point W''', at which there obtains the following relation: GG''=G'G''=WW'''. In that instance, a warm effect of white balance correction can be attained.

Further, the embodiment described is arranged to have two gain control parts 3 and 4. However, the invention is not limited to this. For example, the two gain control parts may be changed to a single part in practicing this invention.

In accordance with this invention, white balance correction can be adequately accomplished by converting any misleading color signal into a normal color signal even in cases where the object is in such a color that tends to cause erroneous correction in carrying out white balance correction.

What is claimed is:

1. An image sensing apparatus comprising:
   a) image sensing means for converting an object image into an electrical output;
   b) white balance control signal forming means for forming a white balance control signal based on said output of said image sensing means;
   c) determining means for determining a kind of color in the output of said image sensing means; and
   d) correction means for correcting said white balance control signal by changing a predetermined first color signal of said output of said image sensing means into a predetermined second color signal different from said first color signal in accordance with an output of said determining means.

2. An apparatus according to claim 1, further comprising gain control means for controlling the gains of a plurality of color signals included in the output of said image sensing means.

3. An apparatus according to claim 2, wherein said gain control means is controlled based on the levels of predetermined color-difference signals included in the output of said image sensing means.

4. An apparatus according to claim 1, wherein said determining means includes dividing means for dividing the output of said image sensing means into a plurality of areas.

5. An apparatus according to claim 4, wherein said dividing means includes gate means.

6. An image sensing apparatus comprising:
   a) image sensing means for converting an object image into an electrical output;
   b) white balance control signal forming means for forming a white balance control signal based on of said output of said image sensing means;
   c) dividing means for dividing, into a plurality of areas, the object image converted into said output of said image sensing means;
   d) determining means for determining the color of each of said plurality of areas; and
   e) correction means for correcting said white balance control signal by changing a predetermined first color signal of said output of said image sensing means into a predetermined second color signal different from said first color signal in accordance with an output of said determining means.

7. An apparatus according to claim 6, further comprising gain control means for controlling the gains of a plurality of color signals included in the output of said image sensing means.

8. An apparatus according to claim 7, wherein said gain control means is controlled based on the levels of predetermined color-difference signals included in the output of said image sensing means.

9. An apparatus according to claim 6, wherein said dividing means includes gate means.

10. An image sensing apparatus, comprising:
    (d) determining means for determining a kind of color in one picture plane from an image signal of said one picture plane;
    (b) color balance control means for effecting color balance control of the image signal on the basis of said image signal; and
    (c) means for varying the control operation of said color balance control means by changing a predetermined first color signal of said image signal into a predetermined second color signal different from said first color signal in accordance with an output of said determining means.

11. An image sensing apparatus according to claim 10, wherein said image signal is comprised of an output of image sensing means which is arranged to effect a photoelectric conversion of an image light coming from an object.

12. An image sensing apparatus according to claim 10, wherein said determining means includes dividing means for dividing one image plane into a plurality of areas and averaging means for averaging color components in each of the divided areas.

13. An image sensing apparatus according to claim 10, wherein said color balance control means includes an amplifier.

14. An image sensing apparatus according to claim 10, wherein said image signal includes a plurality of color difference signals.

15. An image sensing apparatus according to claim 12, wherein said dividing means includes gate means.

16. An apparatus according to claim 1, wherein aid predetermined first color signal is a color signal remote from an R−B axis.

17. An apparatus according to claim 1, wherein said predetermined first color signal includes a yellow signal.

18. An apparatus according to claim 1, wherein said predetermined second color signal is a color signal which substantially satisfies the equation R−B+0.

19. An apparatus according to claim 6, wherein said predetermined first color signal is a color signal remote from an R−B axis.

20. An apparatus according to claim 6, wherein said predetermined first color signal includes a yellow signal.

21. An apparatus according to claim 6, wherein said predetermined second color signal is a color signal which substantially satisfies the equation $R-B=0$.

22. An apparatus according to claim 10, wherein said predetermined first color signal is a color signal remote from an $R-B$ axis.

23. An apparatus according to claim 10, wherein said predetermined first color signal includes a yellow signal.

24. An apparatus according to claim 10, wherein said predetermined second color signal is a color signal which substantially satisfies the equation $R-B=0$.

* * * * *